United States Patent [19]

Jennings et al.

[11] 3,709,383
[45] Jan. 9, 1973

[54] RACKS FOR STORAGE AND TRANSFER PURPOSES

[75] Inventors: Kingsley Jeffrey Jennings; Frederick Gifford Ward, both of Loughborough, England

[73] Assignee: Herbert Morris Limited, Loughborough, Leicester County, England

[22] Filed: March 17, 1971

[21] Appl. No.: 125,262

[30] Foreign Application Priority Data

March 23, 1970 Great Britain..................14,020/70

[52] U.S. Cl. ..........................214/16 B, 104/148 LM
[51] Int. Cl. ................................................E04h 6/06
[58] Field of Search ....................................214/16 B

[56] References Cited

UNITED STATES PATENTS 3,373,727  9/1966  Rogers et al. ......................214/16 B
3,417,879  12/1968  Gough ..............................214/16 B
3,557,973  1/1971  Louviers ...........................214/16 B
3,620,389  11/1971  Munck..............................214/16 B Primary Examiner—Gerald H. Forlenza
Assistant Examiner—R. B. Johnson
Attorney—Norris & Bateman

[57] ABSTRACT

A live storage system in which pallets stored on racks are moved from a feed to a discharge station by a transfer trolley travelling on tracks below the racks and having a platform for raising and lowering pallets from and onto the rack, the transfer trolley carrying an auxiliary trolley for raising the platform both the transfer trolley and the platform being operated by a first linear induction motor with a second linear motor operating in opposition to the first motor to position the transfer trolley at each station and subsequently to return the transfer trolley along the track.

6 Claims, 5 Drawing Figures

RACKS FOR STORAGE AND TRANSFER PURPOSES

This invention relates to live storage systems of the kind in which racks extend in horizontal parallel rows between a feed and discharge station upon which pallets are supported for the storage of merchandise with a traversing trolley travelling longitudinally of each track below the pallets and means on the trolley for raising a pallet for transport along a track from station to station between the feed and the discharge ends of the track.

A live storage system is defined as one in which merchandise such as pallets are supported on racks and in which the merchandise stored on the pallets is moved through the system from a feed station to a discharge station in order that merchandise on the first pallet fed to the storage system will be the first to be discharged therefrom.

It has been proposed to employ a vehicle travelling longitudinally of a track below the pallets driven by a motor with an hydraulic ram on the vehicle to lift a pallet for transfer from one station to the next along the track.

The invention comprises a live storage system of the kind referred to in which the transfer trolley carries a raising and lowering platform connected to a linkage system mounted on shafts transversely of the trolley, thrust between the coils of a linear induction motor mounted on the transfer trolley and a stationary member arranged longitudinally of the track raising the platform and subsequently driving the trolley.

The invention will be described with reference to the accompanying dtawings:

FIG. 1a is a similar view showing the auxiliary trolley in its lowered position.

FIG. 4 is a diagrammatic plan to a smaller scale showing a plurality of racks.

Figure 1:
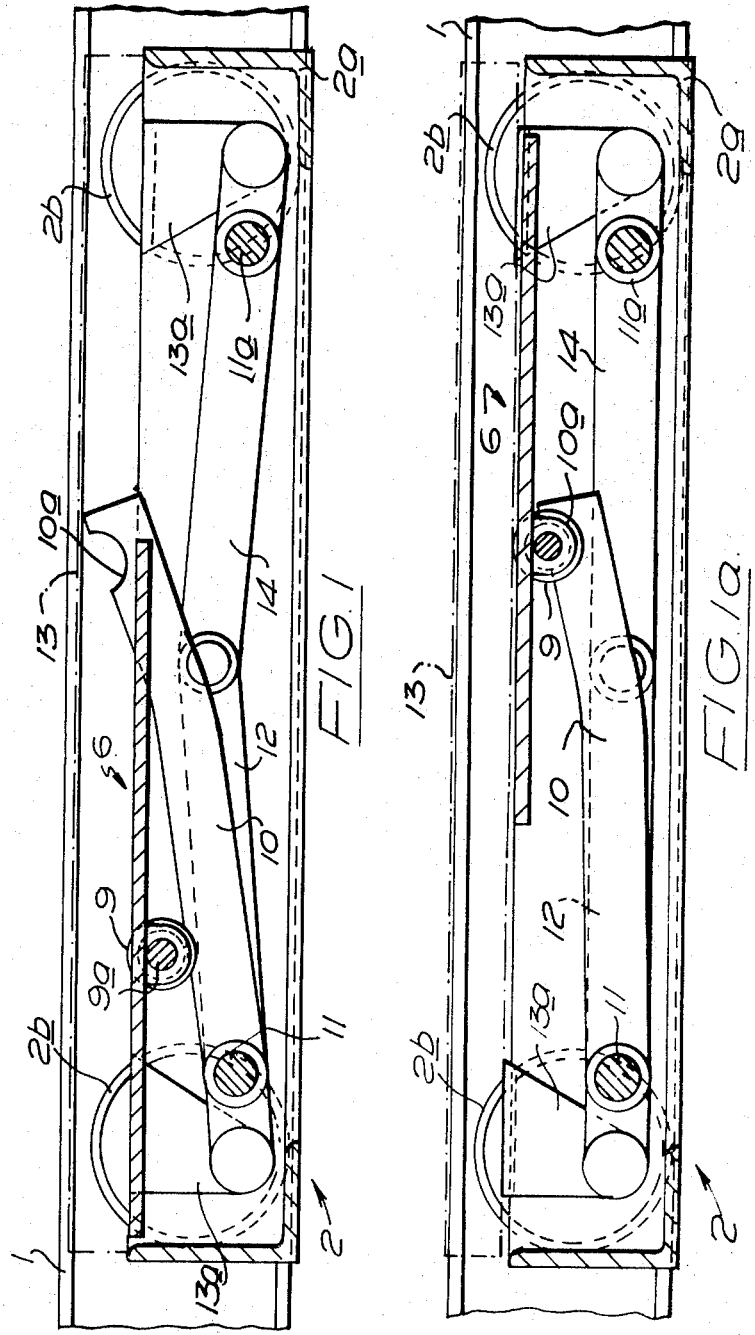
FIG. 1 is a side elevation in section substantially on line 1—1 of FIG. 3 of part of a storage rack showing a transfer trolley mounted thereon.
Figure 2:
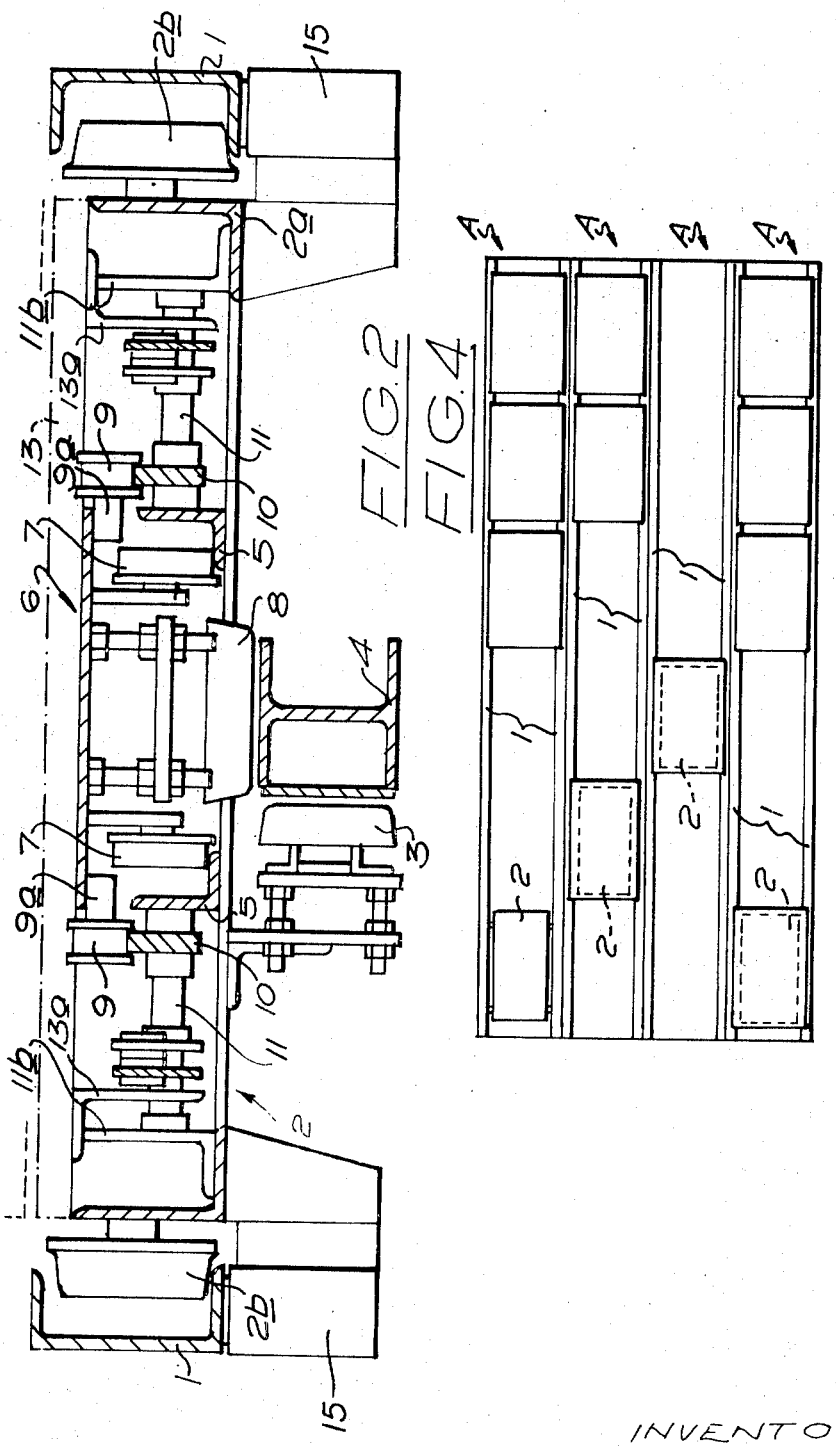
FIG. 2 is a section through a transfer trolley on a line taken at right angles to line 1—1 in FIG. 3.
Figure 3:
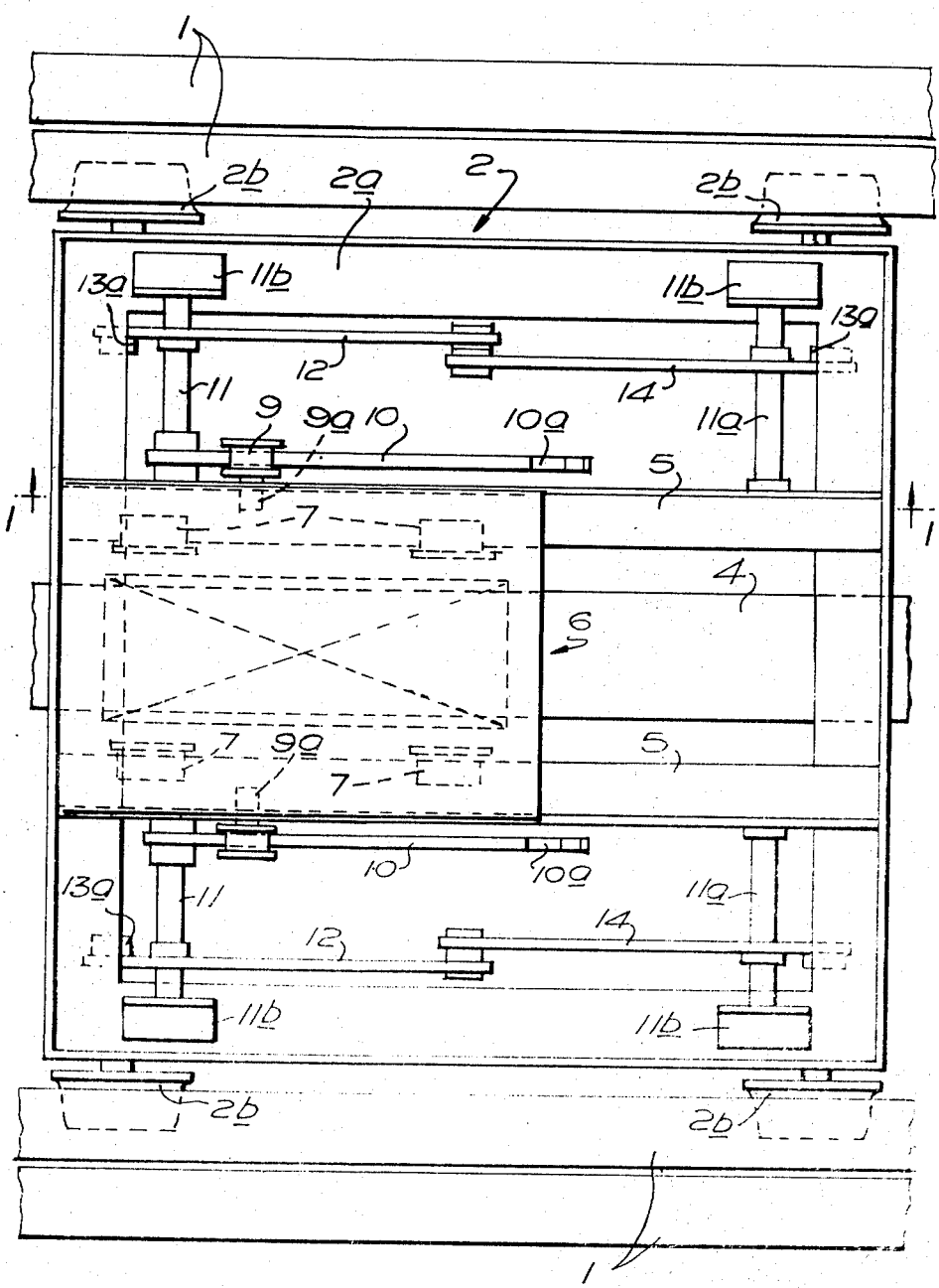
FIG. 3 is a plan of same with the platform removed.

A plurality of storage racks A of any required length are arranged side by side. Each rack comprises two longitudinal girders 1 forming a track spaced apart to support pallets on which merchandise is placed for storage purposes and serves the dual purpose of a rack for supporting the pallets and a track for the transfer of the pallets from one end to the other. When a pallet is removed from a station at one end of the track a pallet standing in the penultimate position is automatically or manually transferred to the discharge position and succeeding pallets are moved on from one station to the next.

The pallets on each rack are moved by a transfer trolley 2 mounted to travel longitudinally on the flanges of the girders 1 below the pallets.

Each trolley 2 comprises a frame 2a mounted on runners 2b for travelling along the flanges of the girders 1. A raising and lowering platform 13 is mounted above the frame 2a.

The transfer trolley 2 carries the coils of a linear motor 3 the stationary member 4 of which, in the form of a metal rail, extends longitudinally of the track, with an airgap between the coils 3 and the stationary member, The rail 4 forms part of the track structure.

The frame 2a is provided with longitudinal angle members 5 to form runways for an auxiliary trolley 6 mounted on runners 7 engaging the runways 5 the auxiliary trolley travelling forwards and backwards within the confines of the trolley 2 under the control of the motor 3 which drives the trolley 2 and the auxiliary trolley 6. A second linear induction motor the coils 8 of which are carried on the auxiliary trolley 6 and separated from the stationary member 4 by a second airgap, serves when energized in opposition to the motor 3 to slow down the trolley for inclining the pallet into position. The coils operating the trolley 2 are preferably arranged at 90° to the coils of the auxiliary trolley 6.

Shafts 11 are mounted transversely of the frame 2a in angle members 11b and 5 at each side of the auxiliary trolley 6 adjacent one end of the frame and shafta 11a are similarly mounted at the opposite end of the frame.

A lever 10 is keyed onto each shaft 11, the lever 10 extending towards the opposite end of the trolley 2 outside the auxiliary trolley 6. A flanged roller 9 is mounted on a stub axle 9a at each side of the auxiliary trolley 6 to engage the upper side of the levers 10.

Further levers 12 are keyed on the shafts 11 intermediate their ends with similar levers 14 keyed on the shafts 11a. Each lever 12 is pivotally connected at one end to the corresponding lever 14 and the free ends of the levers 12 engage brackets 13a on the underside of the platform 13. When the rollers 9 approach the ends of the levers 10 they engage recesses 10a in the levers.

With the equipment at rest and the transfer trolley 2 with its platform 13 in the lowered condition is brought back into use either by the arrival of a pallet at the feed station or by the removal of a pallet from the discharge station. In the case of the former, a pallet being deposited on the rack A will energize the main linear induction motor unit 8 through the means of a limit switch mounted on the trolley and this will cause the platform 13 of the transfer trolley 2 to rise, thereby lifting the pallet from the rack A and transferring its weight to the transfer trolley 2.

To raise the platform 13 for lifting a pallet from the supporting rack A the thrust of the linear motor 8 moves the auxiliary trolley 6 longitudinally of the trolley 2 with the rollers 9 travelling along and depressing the levers 10 and thereby rocking the shafts 11. The rocking movement of the shafts 11 causes the levers 12 to be depressed in unison with the levers 10 and to lift one end of the platform 13 to raise a pallet clear of the rack A. The downward movement of the ends of the levers 12 connected to the ends of the levers 14 simultaneously causes these levers to rock on the shafts 11a in unison and the free ends to rise to lift the other end of the platform 13.

When the platform 13 is raised to its upper limit, an electro magnetic brake 15 on the transfer trolley 2 is released and the trolley will proceed along the track 1 in the direction of the discharge station by the continued thrust of the main linear induction motor unit 8, and, if there are no further pallets on the rack, will proceed to and into the discharge station where the trolley will stop, the main linear induction motor unit 8 will be de-energized the platform 13 thereby depositing the pallet in the discharge station. The transfer trolley will immediately return to the feed station, with the platform in the lowered position, by means of the auxiliary linear induction motor unit 3, where it will automatically come to rest.

Subsequent pallets, being loaded on the rack in the feed station, will be similarly transferred, one at a time, into the penultimate discharge position and determined intermediate positions until the rack is filled. When this condition arises, the transfer trolley will return to the feed station automatically and will remain in that position until the pallet standing in the discharge station is removed.

Removal of this pallet from the discharge station will cause the transfer trolley to travel towards the discharge station with its platform in the lowered condition by the use of the auxiliary linear induction motor unit 3 and, by the employment of sensing means mounted on the trolley, will come to rest beneath the pallet standing in the penultimate discharge position, whereupon the trolley platform 13 will rise by means of the main linear induction motor unit 8 to take the weight of the pallet which will automatically be transferred to the discharge position, following which, commencing with the pallet adjacent to the penultimate discharge position, all other pallets standing on the rack will be transferred, one at a time, towards the discharge station so as to maintain a continuity of pallets from the discharge station without the necessity of the transfer trolley returning to the feed station between movement of individual pallets. Control means may be employed to give priority to the removal of pallets from the feed station as conditions of application demand.

The force necessary to raise the loaded platform 13 and pallet is obtained from the linear force obtained from the linear motor 8 operating through the levers 12, 14 which give the required mechanical advantage.

With the platform raised and the rollers 9 at the limit of their travel in the recesses 10a in levers 10 the release of an electro-magnetic brake 15 mounted on the transfer trolley and the continuing thrust from the linear induction motor coils 8 causes the trolley 2 and the loaded pallet to travel to its required position on the track 1.

Accurate positioning of the trolley 2 is obtained by a combination of energizing the linear induction motor coils 3 to give a thrust in opposition to that of linear motor coils 8 to reduce the speed of travel to a creep speed, and the electro-magnetic brakes 15 on the track pad, which may be of the disc or drum type, operating in conjunction with limit switches mounted on the trolley 2 which engage members on the track or cams at the track feed and discharge stations.

An electronic control unit may be mounted on the trolley 2 and electric current is supplied to conductor wires mounted on insulators along the length of the track, the conductors engaging with slipper type current collectors fitted to the trolley 2. Although the invention has been described with reference to a live storage system, it may be applied to transport in guided or unguided manner, of loads which require lifting, carrying or depositing and the system may be operated semi-automatically or manually.

What we claim is:

1. A live storage system comprising racks extending in horizontal parallel rows between feed and discharge stations upon which pallets are supported for the storage of merchandise, a trolley travelling longitudinally of each rack, tracks below the pallets on which the trolley runs and means on the trolley for raising a pallet for transport along the track from station to station between the feed and discharge ends of the rack, the invention comprising a linkage system, shafts mounted transversely of the transfer trolley on which the linkage system pivots, a platform supported by the linkage system, coils forming the moving member of a linear induction motor mounted on the trolley and a stationary member of the motor extending longitudinally of the track, the thrust generated by the linear motor lifting the platform and subsequently driving the transfer trolley.

2. A live storage system as in claim 1 comprising in addition an auxiliary trolley for operating the linkage system mounted longitudinally on the transfer trolley and racks on the transfer trolley on which the auxiliary trolley travels.

3. A live storage system as in claim 1 in which the linear motor drives both the transfer trolley and the auxiliary trolley.

4. A live storage system as in claim 1 comprising in addition a second linear motor operating in opposition to the first motor to control the position of the transfer trolley at each station and for returning the transfer trolley along the track.

5. A live storage system as in claim 1 comprising in addition an electro-magnetic brake on the transfer trolley to hold the latter at rest at each station.

6. A live storage system as in claim 1 comprising in addition an auxiliary carriage mounted to travel longitudinally of the transfer trolley under the action of the linear motor, rollers on the auxiliary trolley, first levers mounted on the shafts on the transfer trolley engaged by the rollers, further levers mounted on the shafts on the transfer trolley moving in unison with the first levers as the auxiliary trolley advances to raise the platform and a further linear motor on the auxiliary trolley operating in opposition to the first linear motor to slow down the transfer trolley and subsequently to traverse the transfer trolley in the opposite direction along the track.

* * * * *